US012539457B2

(12) United States Patent
Nakashima et al.

(10) Patent No.: US 12,539,457 B2
(45) Date of Patent: Feb. 3, 2026

(54) EXERCISE SUPPORT SYSTEM, EXERCISE SUPPORT METHOD, AND COMPUTER READABLE MEDIUM

(71) Applicant: TOYOTA JIDOSHA KABUSHIKI KAISHA, Toyota (JP)

(72) Inventors: Issei Nakashima, Katsushika-ku (JP); Toru Miyagawa, Seto (JP); Hideo Hasegawa, Nagoya (JP); Yusuke Kinoshita, Ota-ku (JP); Makoto Aso, Mishima (JP); Takatoshi Morimitsu, Toyota (JP); Aya Ishihara, Taito-ku (JP); Hiroshi Shimada, Tajimi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 241 days.

(21) Appl. No.: 18/362,461

(22) Filed: Jul. 31, 2023

(65) Prior Publication Data

US 2024/0033605 A1 Feb. 1, 2024

(30) Foreign Application Priority Data

Aug. 1, 2022 (JP) ................. 2022-122664

(51) Int. Cl.
*A63B 71/06* (2006.01)
*A63B 24/00* (2006.01)
(Continued)

(52) U.S. Cl.
CPC ...... *A63B 71/0622* (2013.01); *A63B 24/0062* (2013.01); *G08B 21/18* (2013.01); *G16H 40/67* (2018.01)

(58) Field of Classification Search
CPC ............ A63B 71/0622; A63B 24/0062; G16H 40/67; G08B 21/18
See application file for complete search history.

(56) References Cited

U.S. PATENT DOCUMENTS 10,709,955 B2 * 7/2020 Elford ................ A63B 71/0616
11,167,172 B1 * 11/2021 Putnam ................ A61B 5/0816
(Continued)

FOREIGN PATENT DOCUMENTS

| CN | 106779601 A | 5/2017 |
| CN | 112835413 A | 5/2021 |

(Continued)

*Primary Examiner* — Nazia Naoreen
(74) *Attorney, Agent, or Firm* — Finnegan, Henderson, Farabow, Garrett and Dunner, LLP (57) ABSTRACT

A server includes a detection signal reception unit that receives a detection signal related to a detection of an exercise of a user A, an exercise schedule reception unit that acquires an exercise schedule of the user A, and a message request transmission unit that transmits a message request to a UEN of a user N before the exercise schedule. The server further includes a message reception unit that receives a message corresponding to the message request from the UEN of the user N, a determination unit that determines whether or not the user A is exercising according to the exercise schedule based on the exercise schedule and the detection signal, and a mess age transmission unit that provides the user A with the message when the determination unit determines that the user A is exercising according to the exercise schedule.

10 Claims, 8 Drawing Sheets

(51) Int. Cl.
*G08B 21/18* (2006.01)
*G16H 40/67* (2018.01)

(56) References Cited

U.S. PATENT DOCUMENTS

| | | | |
|---|---|---|---|
| 11,684,260 B2* | 6/2023 | Wiedenhoefer | A61B 5/02055 600/301 |
| 2009/0076903 A1* | 3/2009 | Schwarzberg | G06Q 30/0217 705/14.19 |
| 2009/0131089 A1* | 5/2009 | Micali | H04L 67/306 455/466 |
| 2010/0030857 A1* | 2/2010 | Hayet | G09B 7/02 715/810 |
| 2010/0048358 A1* | 2/2010 | Tchao | A63B 24/0084 482/8 |
| 2010/0106783 A1 | 4/2010 | Kinoshita | |
| 2012/0116550 A1 | 5/2012 | Hoffman et al. | |
| 2016/0260340 A1* | 9/2016 | Discount | G09B 19/0038 |
| 2021/0134435 A1 | 5/2021 | Deno et al. | |
| 2022/0202375 A1* | 6/2022 | Silverstein | A61B 5/6802 |
| 2022/0283855 A1 | 9/2022 | Liu | |

FOREIGN PATENT DOCUMENTS

| | | |
|---|---|---|
| JP | 2010-009526 A | 1/2010 |
| JP | 2016-538088 A | 12/2016 |
| JP | 2017-142819 A | 8/2017 |
| JP | 2018-045393 A | 3/2018 |
| JP | 2020-013208 A | 1/2020 |
| JP | 2021-051424 A | 4/2021 |
| WO | WO 2008/099441 A1 | 8/2008 |
| WO | WO 2015/027194 A1 | 2/2015 |

* cited by examiner

| data No. | USER ID | EXERCISE SCHEDULE | MESSAGE |
|---|---|---|---|
| 3129 | 45483 | FRI 07/15/2022<br>9:00-9:30<br>RUN | THE FORECAST SAYS IT'S GOING TO BE HOT IN THE MORNING.<br><br>STAY HYDRATED WHILE RUNNING!<br><br>I PLAN TO PLAY BADMINTON WITH MY FRIENDS THE DAY AFTER TOMORROW.<br>I'LL SEND YOU ANOTHER PHOTO! |
| 3130 | 45483 | SAT 07/30/2022<br>6:00-14:30<br>HIKE | |
| 3131 | 45483 | FRI 09/02/2022<br>8:47-15:30<br>GOLF | |
| ⋮ | ⋮ | ⋮ | |

EXERCISE SUPPORT SYSTEM, EXERCISE SUPPORT METHOD, AND COMPUTER READABLE MEDIUM

CROSS REFERENCE TO RELATED APPLICATIONS

This application is based upon and claims the benefit of priority from Japanese patent application No. 2022-122664, filed on Aug. 1, 2022, the disclosure of which is incorporated herein in its entirety by reference.

BACKGROUND

The present disclosure relates to an exercise support system, an exercise support method, and a computer readable medium.

Japanese Unexamined Patent Application Publication No. 2018-045393 discloses a health management system for ensuring that a user obtains a necessary amount of exercise in daily activities. This health management system presents appropriate activities at appropriate timings to the user according to a fulfilment rate of a preset target value of exercise. In addition, a screen displayed when the user launches a dedicated application on a smartphone displays advice generated automatically by the system, as well as comments and messages of support from family and friends.

Japanese Unexamined Patent Application Publication No. 2017-142819 discloses an exercise activity monitoring mobile device that helps a user find a motivation necessary to maintain an exercise program. The device also provides the user with comments, suggestions, and words of encouragement before, during, and after a run or an exercise workout. The device also creates text, audio, and video messages to send to the user when they reach a predetermined distance during a run.

Japanese Unexamined Patent Application Publication No. 2020-013208 discloses a behavior change support apparatus that enables a user to be instructed by a doctor or a family member in accordance with the user's daily behavior for the purpose of promoting behavior change related to her/his lifestyle.

SUMMARY

In Japanese Unexamined Patent Application Publication Nos. 2018-045393, 2017-142819, and 2020-013208 mentioned above, the users' motivations to exercise may be further increased.

An object of the present disclosure is to provide a new technique to increase users' motivations for exercise.

According to a first aspect of the present disclosure, an exercise support system includes:
  a detection signal reception unit configured to receive a detection signal related to a detection of an exercise of a user;
  an exercise schedule acquisition unit configured to acquire an exercise schedule of the user;
  a message request transmission unit configured to transmit a message request to another user's terminal before the exercise schedule;
  a message reception unit configured to receive a message corresponding to the message request from the other user's terminal;
  a determination unit configured to determine whether or not the user is exercising according to the exercise schedule based on the exercise schedule and the detection signal; and
  a provision unit configured to provide the user with the message when the determination unit determines that the user is exercising according to the exercise schedule is provided.

According to the above configuration, the user's motivation for exercise can be increased.

The message request transmission unit may be configured to transmit the message request on or before a date defined in the exercise schedule.

The message request transmission unit may be configured to transmit the message request on or after a date that is a predetermined number of days before a date defined in the exercise schedule.

The message request may include an exercise subject defined in the exercise schedule.

The message may be related to an exercise subject defined in the exercise schedule.

The message request may include a date, a day of a week, or a time period defined in the exercise schedule.

The message may be related to a date, a day of a week, a time period defined in the exercise schedule.

The message may be a message of support for encouraging the user to exercise.

According to a second aspect of the present disclosure, an exercise support method performed by a computer includes:
  receiving a detection signal related to a detection of an exercise of a user;
  acquiring an exercise schedule of the user;
  transmitting a message request to another user's terminal before the exercise schedule;
  receiving a message corresponding to the message request from the other user's terminal;
  determining whether or not the user is exercising according to the exercise schedule based on the exercise schedule and the detection signal; and
  providing the user with the message when it is determined that the user is exercising according to the exercise schedule is provided.

According to the above method, the user's motivation for exercise can be increased.

According to a third aspect of the present disclosure, a non-transitory computer readable medium causes a computer to function as:
  a detection signal reception unit configured to receive a detection signal related to a detection of an exercise of a user;
  an exercise schedule acquisition unit configured to acquire an exercise schedule of the user;
  a message request transmission unit configured to transmit a message request to another user's terminal before the exercise schedule;
  a message reception unit configured to receive a message corresponding to the message request from the other user's terminal;
  a determination unit configured to determine whether or not the user is exercising according to the exercise schedule based on the exercise schedule and the detection signal; and
  a provision unit configured to provide the user with the message when the determination unit determines that the user is exercising according to the exercise schedule is provided.

According to the above program, the user's motivation for exercise can be increased.

According to the present disclosure, it is possible to provide a new technique to increase users' motivations for exercise.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

An embodiment of the present disclosure will be described below with reference to FIGS. 1 to 8.

Figure 1:
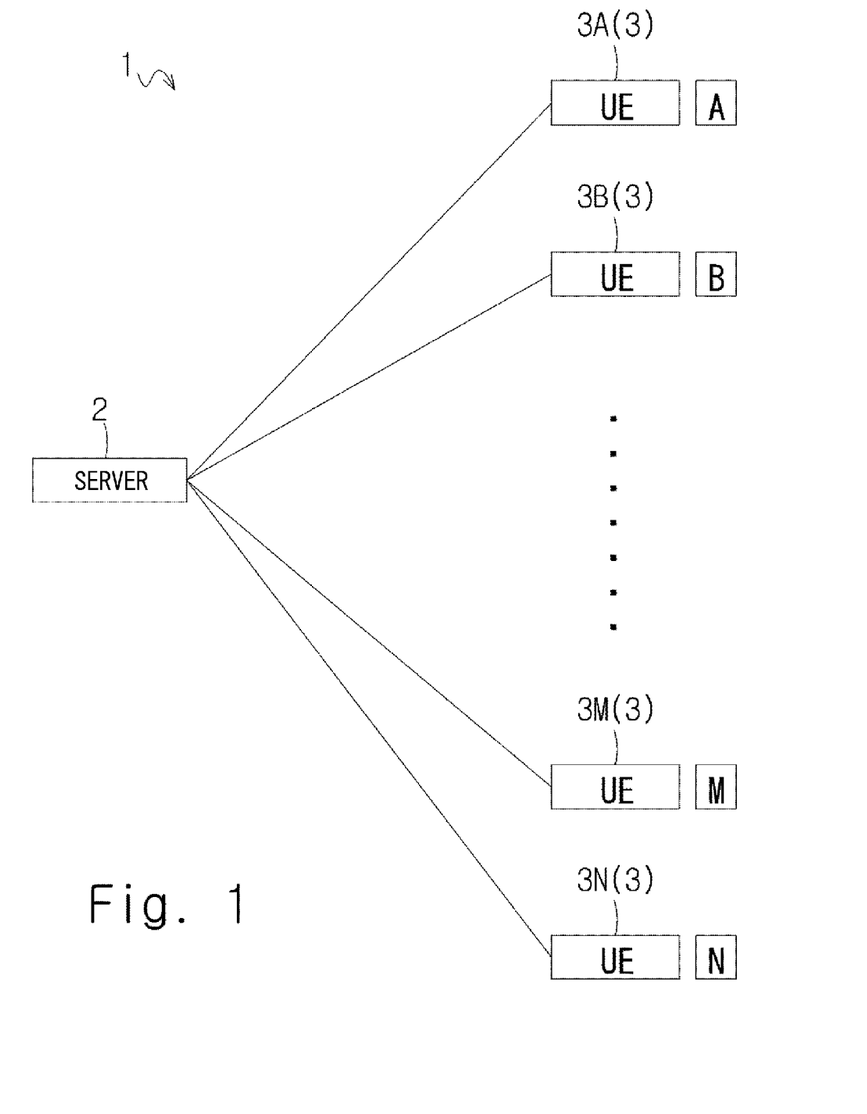
FIG. 1 is an overall overview diagram of a communication system.

FIG. 1 is an overall overview diagram of a communication system 1. The communication system 1 includes a server 2 and a plurality of UEs 3. The server 2 is one specific example of an exercise support system. The plurality of UEs 3 are typically capable of two-way communication with the server 2 over an Internet line. Each of the plurality of UEs 3 is typically a smartphone owned by each of the plurality of users. That is, a UE 3A is a smartphone owned by a user A. A UE3B is a smartphone owned by a user B. A UE3M is a smartphone owned by a user M. A UE 3N is a smartphone owned by a user N.

The users A to N belong to a particular community. A particular community is typically a community of related families. Alternatively, a particular community may be a community with the same workplace, a community with the same residential area, or any other community.

In this embodiment, for illustrative purposes, the user A is assumed to be the user N's grandfather. That is, the user N is the user A's grandson. The server 2 is configured to increase the user A's motivation for exercise by presenting the user A with a message of support from the user N.

Figure 2:
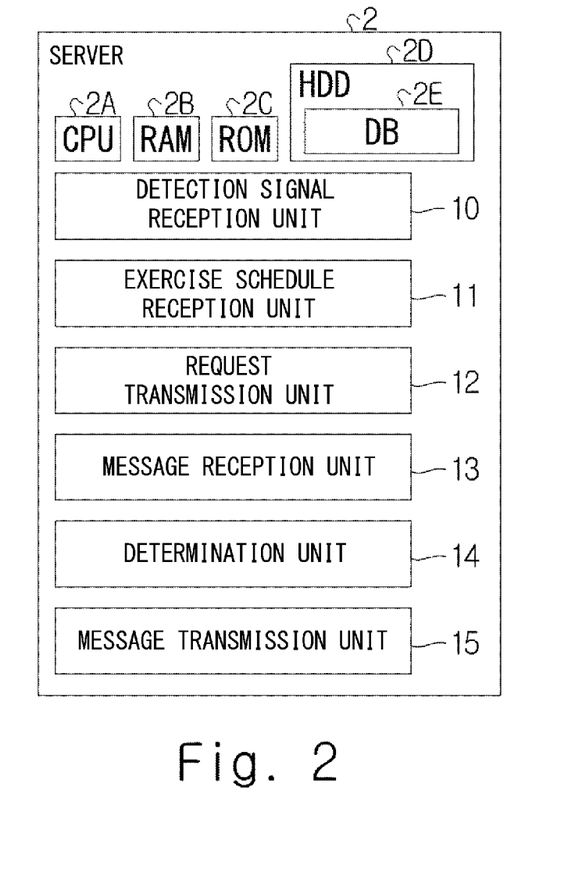
FIG. 2 is a functional block diagram of a server.

As shown in FIG. 2, the server 2 includes a CPU 2A (Central Processing Unit), a RAM 2B (Random Access Memory) that can be freely read and written, and a ROM 2C (Read Only Memory). The server 2 further includes an HDD 2D (Hard Disk Drive) as an external storage apparatus. The CPU 2A reads and executes a control program stored in the ROM 2C, and thus the control program causes hardware such as the CPU 2A to function as a detection signal reception unit 10, an exercise schedule reception unit 11, a request transmission unit 12, a message reception unit 13, a determination unit 14, and a message transmission unit 15.

The detection signal reception unit 10 receives a detection signal related to a detection of an exercise of the user A. That is, when the detection signal reception unit 10 receives the detection signal, it means that the user A is currently exercising. The detection signal reception unit 10 receives the detection signal from the UE 3A.

The exercise schedule reception unit 11 acquires an exercise schedule of the user A. Specifically, the exercise schedule reception unit 11 acquires the exercise schedule of the user A by receiving the exercise schedule of the user A from the UE 3A. The exercise schedule reception unit 11 is one specific example of an exercise schedule acquisition unit.

The exercise schedule is typically data defining the exercise subject of the exercise scheduled by the user A and a date, a day of the week, and a time period of the scheduled exercise. The exercise schedule may be data defining the exercise subject of the exercise scheduled by the user A and the date and time period of the scheduled exercise. The exercise schedule may be data defining the exercise subject of the exercise scheduled by the user A and the date of the scheduled exercise. The exercise schedule may be data defining the date on which the user A is scheduled to exercise.

The request transmission unit 12 transmits a message request to the user N's UE 3N before the exercise schedule. The term "before the exercise schedule" typically means "on or before the date defined in the exercise schedule". As an example, the request transmission unit 12 transmits a message request to the user N's UE 3N on the day before, or two or three days before the date defined in the exercise schedule. The request transmission unit 12 is an example of a message request transmission unit.

The message request may include at least one of the date, the day of the week, the time period, and the exercise subject defined in the exercise schedule. In this embodiment, the message request includes the date, the time period, and the exercise subject defined in the exercise schedule.

The message reception unit 13 receives a message corresponding to the message request from the UE 3N. The message the message reception unit 13 receives from the UE 3N is a message of support for encouraging the user A to exercise.

Based on the exercise schedule and the detection signal, the determination unit 14 determines whether or not the user A is exercising according to the exercise schedule. "The user A is exercising according to the exercise schedule" means that the user A is exercising on the date and in the time period defined in the exercise schedule. "The user A is exercising according to the exercise schedule" may mean that the user A is exercising on the date defined in the exercise schedule. In other words, a case in which the user A is exercising on the date of the schedule but in a time period different from the scheduled time period may also be regarded that the user A is exercising according to the exercise schedule.

If the determination unit 14 determines that the user A is exercising according to the exercise schedule, the message transmission unit 15 provides a message to the user A. In this embodiment, the message transmission unit 15 provides a message to the user A by transmitting a message to the user A's UE 3A. The message transmission unit 15 is one specific example of a provision unit.

Figure 3:
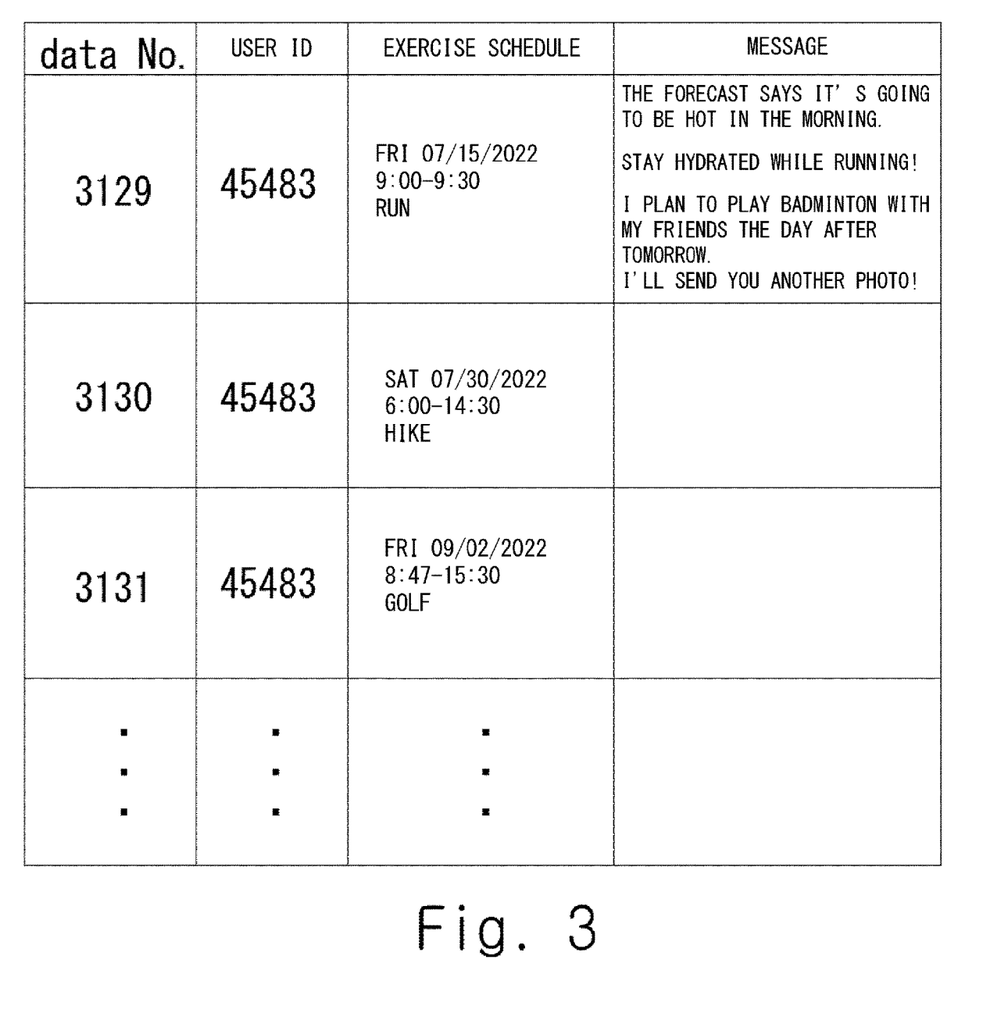
FIG. 3 is data held by a database.

A DB2E is stored in the HDD2D. FIG. 3 shows data held by the DB2E. As shown in FIG. 3, the DB2E holds a user ID of the user, the exercise schedule of the user, and the message provided to the user in association with each other. In FIG. 3, a user ID of the user A is 45483. The user A has registered a plurality of exercise schedules in the DB2E.

Next, a functional block diagram of the UE 3A will be described with reference to FIG. 4.

The UE 3A includes a CPU 4A (Central Processing Unit), a RAM 4B (Random Access Memory) that can be freely read and written, and a ROM 4C (Read Only Memory). The UE 3A further includes an LCD 4D (Liquid Crystal Display), a touch panel 4E, and a speaker 4F. The CPU 4A reads and executes a control program stored in the ROM 4C, and thus the control program causes hardware such as the CPU 4A to function as an acceleration data reception unit 20, a detection signal transmission unit 21, an exercise schedule input unit 22, an exercise schedule transmission unit 23, a message reception unit 24, and a message output unit 25.

A wearable terminal 26 worn by the user A is typically connected to the UE 3A via Bluetooth (registered trademark). The wearable terminal 26 typically has an acceleration sensor. The wearable terminal 26 periodically transmits acceleration data from the acceleration sensor to the UE 3A.

The acceleration data reception unit 20 receives the acceleration data from the wearable terminal 26.

The detection signal transmission unit 21 determines whether or not the user A is exercising based on the received acceleration data. When it is determined that the user A is exercising, the detection signal transmission unit 21 transmits a detection signal related to the detection of the exercise of the user A to the server 2.

The exercise schedule input unit 22 accepts an input of the exercise schedule by the user A. The user A typically inputs the exercise schedule through the touch panel 4E.

The exercise schedule transmission unit 23 transmits the exercise schedule input by the user A to the server 2.

The message reception unit 24 receives a message from the server 2.

The message output unit 25 outputs the message received by the message reception unit 24. The message output unit 25 typically outputs the message on a screen of the LCD 4D. Alternatively, the message output unit 25 may output an audio of the message via the speaker 4F.

Figure 5:
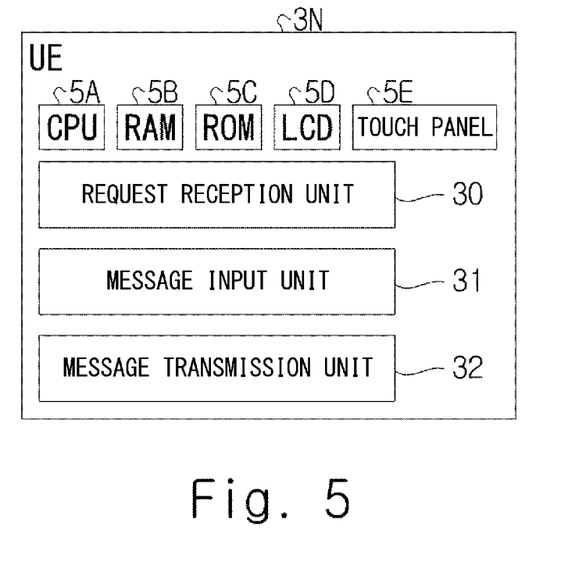
FIG. 5 is a functional block diagram of a user N's user terminal.

Next, a functional block diagram of the UE 3N will be described with reference to FIG. 5.

The UE 3N includes a CPU 5A (Central Processing Unit), a RAM 5B (Random Access Memory) that can be freely read and written, and a ROM 5C (Read Only Memory). The UE 3N further includes an LCD 5D (Liquid Crystal Display) and a touch panel 5E. The CPU 5A reads and executes a control program stored in the ROM 5C, and thus the control program causes hardware such as the CPU 5A to function as a request reception unit 30, a message input unit 31, and a message transmission unit 32.

The request reception unit 30 receives a message request from the server 2.

The message input unit 31 receives an input of a message by the user N.

The message transmission unit 32 transmits the message input by the user N to the server 2.

Figure 6:
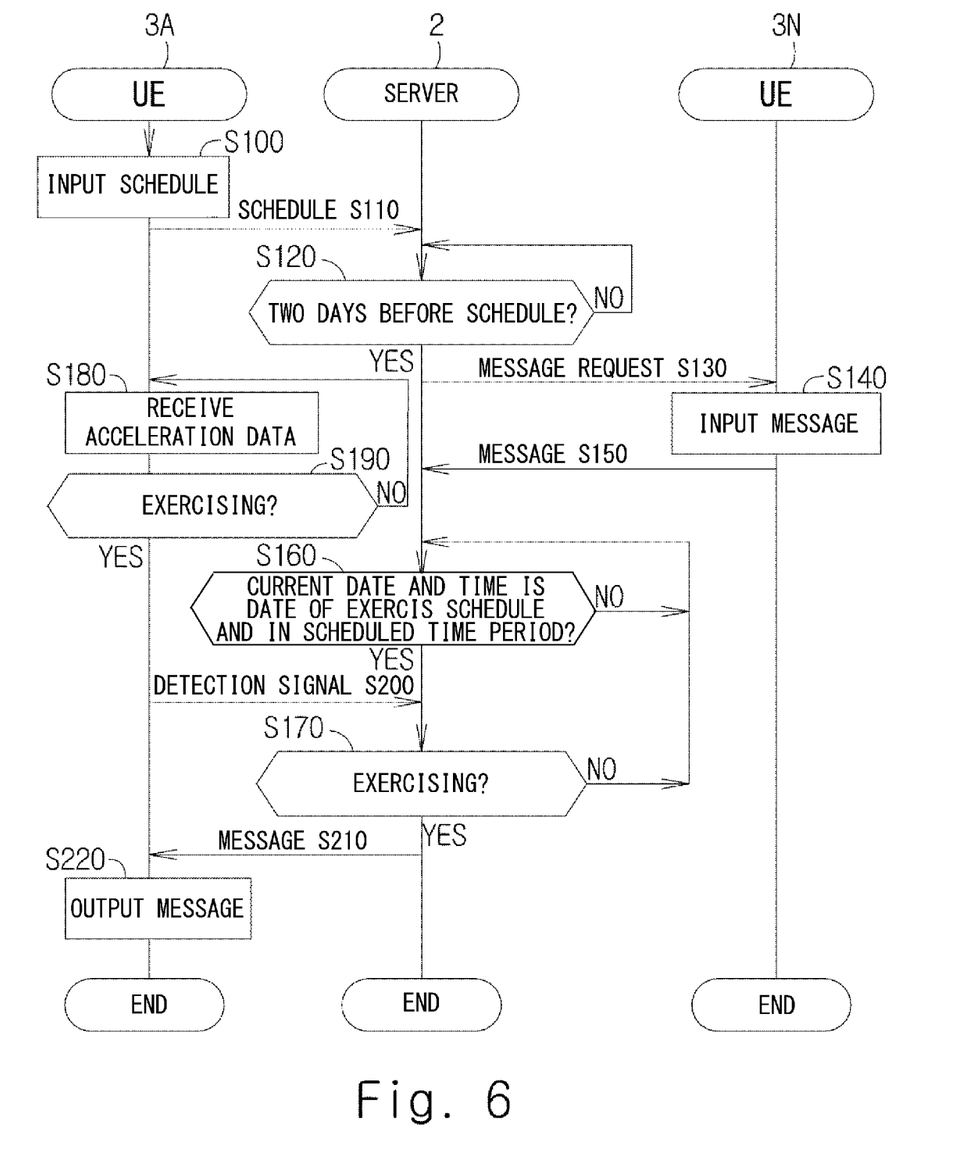
FIG. 6 is a sequence diagram of the communication system.

Next, an operation flow of the communication system 1 is described with reference to FIGS. 6 to 8. FIG. 6 is a sequence diagram of the communication system 1.

First, the exercise schedule input unit 22 of the UE 3A displays an exercise schedule input screen on the LCD 4D. The user A operates the touch panel 4E to input an exercise schedule to the UE 3A (S100).

Next, the exercise schedule transmission unit 23 of the UE 3A transmits the exercise schedule input by the UE 3A to the server 2 (S110). That is, the exercise schedule reception unit 11 of the server 2 receives the exercise schedule from the UE 3A (S110). As shown in FIG. 3, the exercise schedule reception unit 11 registers the received exercise schedule in the DB2E in association with the user ID of the user A.

Next, the request transmission unit 12 of the server 2 determines whether or not today's date is two days before the date defined in the exercise schedule registered in the DB2E (S120). When a result of the determination is NO, the request transmission unit 12 repeats Step S120. When the result of the determination is YES, the request transmission unit 12 transmits the message request to the UE 3N (S130). That is, the request reception unit 30 of the UE 3N receives the message request from the server 2 (S130).

Figure 7:
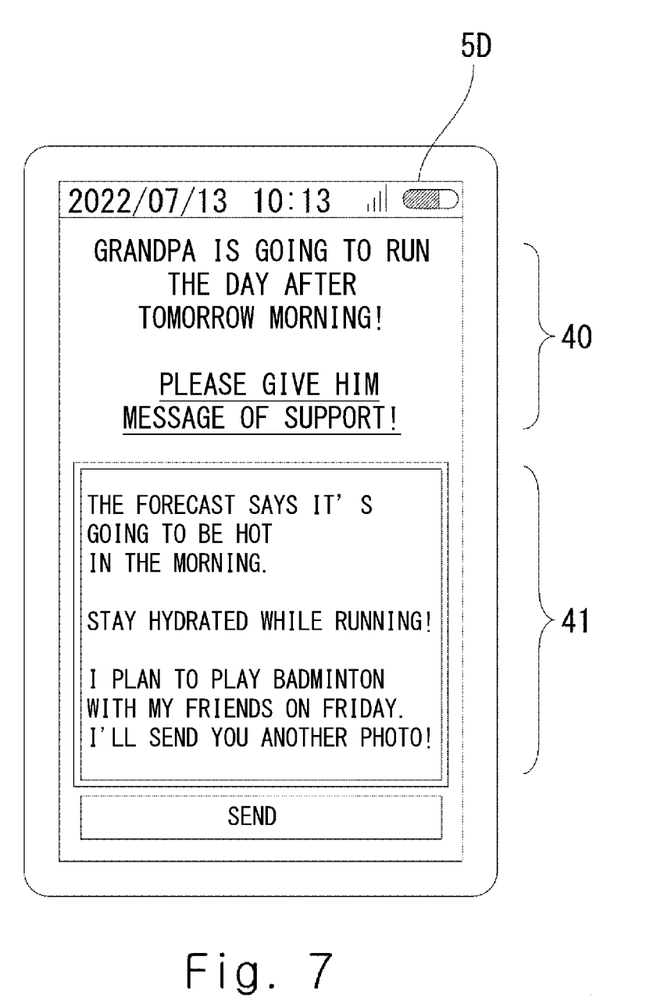
FIG. 7 is an image display example of the user N's user terminal.
Figure 8:
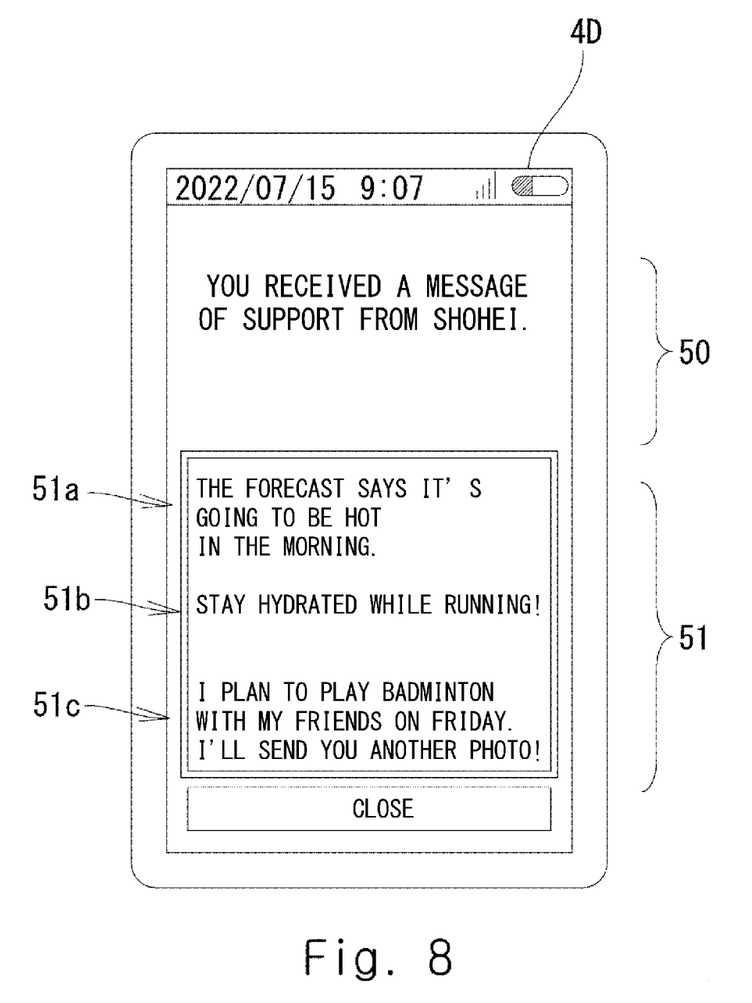
FIG. 8 is an image display example of the user A's user terminal.

Next, the message input unit 31 of the UE 3N displays a message input screen on the LCD 5D as shown in FIG. 7. The message input screen shown in FIG. 7 includes a text 40 prompting an input of a message and a text box 41 for inputting a message. As shown in FIG. 7, the message input unit 31 automatically generates the text 40 in response to a message request. The text 40 includes a name indicating the user A and a date, a time period, and an exercise subject defined in the exercise schedule of the user A. That is, according to the text 40, it is possible to understand who does what kind of exercise in which time period.

Next, the message input unit 31 accepts a message that the user N has input to the UE 3N by operating the touch panel 5E (S140).

Next, the message transmission unit 32 of the UE 3N transmits the message input by the user N to the server 2 (S150). That is, the message reception unit 13 of the server 2 receives the message from the UE 3N (S150). The message reception unit 13 stores the message received from the UE 3N in the DB2E in association with the corresponding exercise schedule.

Next, the determination unit 14 of the server 2 determines whether or not the user A is exercising according to the exercise schedule based on the exercise schedule and the detection signal (S160 and S170).

That is, in the UE 3A, the acceleration data reception unit 20 receives acceleration data from the wearable terminal 26 (S180). The detection signal transmission unit 21 determines whether or not the user A is exercising according to the received acceleration data (S190). When a result of the determination is NO, the detection signal transmission unit 21 returns the processing to S180. On the other hand, when the result of the determination is YES, the detection signal transmission unit 21 transmits the detection signal to the server 2 (S200).

In the server 2, the determination unit 14 determines whether or not the current date and time is the date of the exercise schedule and in the scheduled time period (S160). When a result of the determination is NO, the determination unit 14 repeats the processing of S160. On the other hand, when the result of the determination is YES, the determination unit 14 proceeds the processing to S170.

Next, the determination unit 14 determines whether or not the user A is currently exercising based on the detection signal received by the detection signal reception unit 10 (S170). When a result of the determination is NO, the determination unit 14 returns the processing to S160. On the other hand, when the result of the determination is YES, the determination unit 14 proceeds the processing to S210.

Next, the message transmission unit 15 refers to the DB2E and transmits a message corresponding to the exercise schedule currently being carried out to the UE 3A (S210). That is, the message reception unit 24 of the UE 3A receives a message from the server 2 (S210).

Next, the message output unit 25 of the UE 3A provides the message received by the message reception unit 13 to the user A (S220). The message is typically provided by being output on a screen or an audio as described above. In this embodiment, the message output unit 25 displays on the LCD 4D a support screen including the message received by the message reception unit 24. FIG. 8 shows an example of the support screen. As shown in FIG. 8, the support screen includes a text 50 identifying a source of the message and a message 51. As shown in FIG. 8, the message 51 includes a message 51a related to the date or time period defined in the corresponding exercise schedule, a message 51b related to the exercise subject defined in the corresponding exercise schedule, and another message 51c. Therefore, when the user A exercises according to the exercise schedule, he/she can receive messages of support from his/her grandchild and thus be made to feel happy, and his/her motivation for exercise can be increased, because he/she is glad that he/she exercised according to the exercise schedule.

An embodiment according to this disclosure has been described above. The above embodiment has the following features.

The server 2 (exercise support system) includes the detection signal reception unit 10 configured to receive a detection signal related to a detection of an exercise of the user A, the exercise schedule reception unit 11 (exercise schedule acquisition unit) configured to acquire an exercise schedule of the user A, and the message request transmission unit 12 (message request transmission unit) configured to transmit a message request to the UE 3N (terminal) of the user N before the exercise schedule. The server 2 further includes the message reception unit 13 configured to receive a message corresponding to the message request from the UE 3N of the user N, the determination unit 14 configured to determine whether or not the user A is exercising according to the exercise schedule based on the exercise schedule and the detection signal, and the message transmission unit 15 (provision unit) configured to provide the user A with the message when the determination unit 14 determines that the user A is exercising according to the exercise schedule. According to the above configuration, the motivation of the user A to exercise can be increased.

In particular, the request transmission unit 12 transmits a message request to the UE 3N of the user N before the exercise schedule. According to the above configuration, it is highly possible that the message reception unit 13 can receive a message corresponding to the message request before the exercise schedule. Therefore, the message transmission unit 15 can reliably provide the message to the user A when the user A is exercising according to the exercise schedule. That is, it is possible to avoid a situation in which the message from the user N is not ready in the first place when the user A tries to provide the message from the user N to the user A while the user A is exercising according to the exercise schedule.

Also, the request transmission unit 12 transmits the message request on or before the date defined in the exercise schedule. According to the above configuration, the message transmission unit 15 can provide the message to the user A more reliably when the user A is exercising according to the exercise schedule.

Moreover, the request transmission unit 12 transmits the message request on or after the date which is a predetermined number of days before the date defined in the exercise schedule. The predetermined number of days is typically 7 days. Thus, for example, if the request transmission unit 12 transmits a message request on a date far earlier than the date defined in the exercise schedule, the user N will be forced to message the user A's exercise schedule far in the future. In this case, it is difficult for the user N to create a considerate message. On the other hand, by making the date on which the request transmission unit 12 transmits a message request close to the date defined in the exercise schedule, the user N can create a considerate message. This can be expected to have the effect of increasing the motivation of the user A to exercise.

Also, as shown in, for example, FIG. 7, the message request includes exercise subject defined in the exercise schedule. With the above configuration, for example, as shown in FIG. 7, the user N can create a considerate message related to the exercise subject such as "Stay hydrated while running!".

Also, as shown in FIG. 7, for example, the message request includes a date, a day of the week, or a time period defined in the exercise schedule. According to the above configuration, for example, as shown in FIG. 7, the user N can create a considerate message related to the date, the day of the week, or the time period such as "The forecast says it's going to be hot in the morning".

Also, as shown in FIG. 7, for example, the message is a message of support for encouraging the user A to exercise.

The preferred embodiment of the disclosure has been described above. The above embodiment can be modified as follows.

Figure 4:
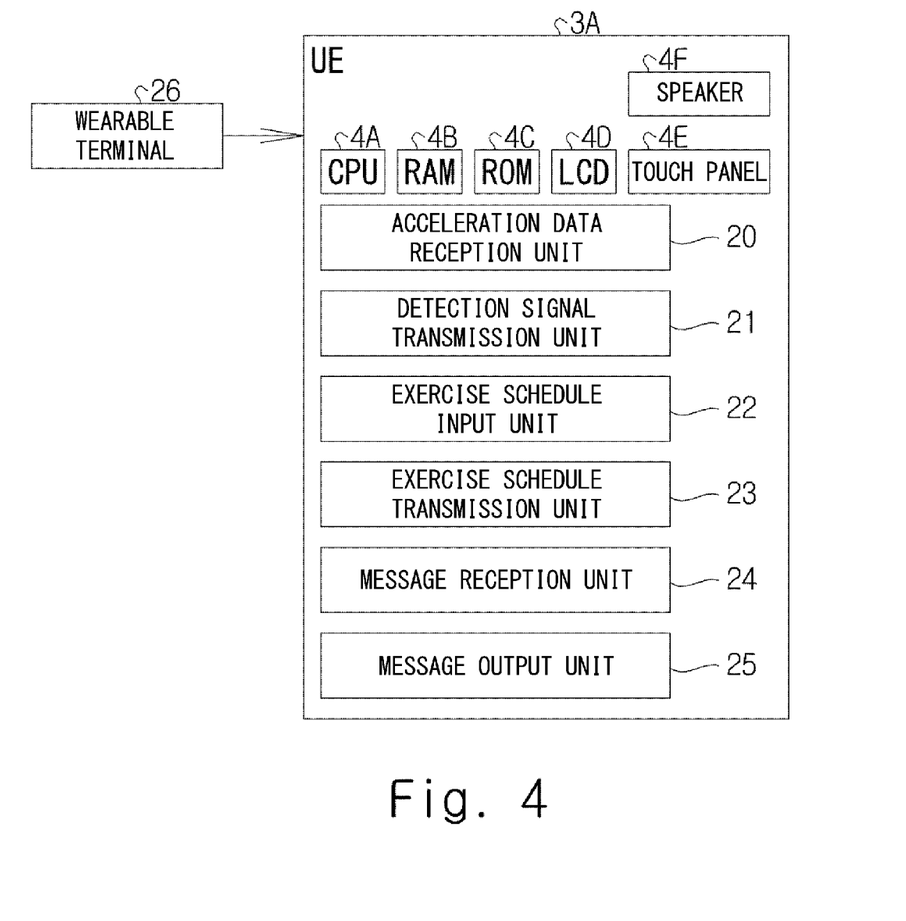
FIG. 4 is a functional block diagram of a user A's user terminal.

Specifically, the UE 3A shown in FIG. 4 may include the DB2E of the server 2 shown in FIG. 2 and each functional unit. The server 2 shown in FIG. 2 may be distributed over a plurality of computers.

The programs can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. An exercise support system comprising:
    at least one memory storing instructions and
    at least one processor configured to execute the instructions to:
    receive a detection signal related to a detection of an exercise of a first user;
    acquire an exercise schedule of the first user;
    transmit a message request to a terminal of a second user different from the first user before the exercise schedule of the first user;
    receive a message corresponding to the message request from the terminal of the second user;
    determine whether or not the first user is exercising according to the exercise schedule based on the exercise schedule and the detection signal; and provide the first user with the message from the terminal of the second user when determining that the user is exercising according to the exercise schedule.

2. The exercise support system according to claim 1, wherein
the at least one processor is further configured to execute the instructions to:
transmit the message request on or before a date defined in the exercise schedule.

3. The exercise support system according to claim 1, wherein the at least one processor is further configured to execute the instructions to:
transmit the message request on or after a date that is a predetermined number of days before a date defined in the exercise schedule.

4. The exercise support system according to claim 1, wherein
the message request includes an exercise subject defined in the exercise schedule.

5. The exercise support system according to claim 1, wherein
the message is related to an exercise subject defined in the exercise schedule.

6. The exercise support system according to claim 1, wherein
the message request includes a date, a day of a week, or a time period defined in the exercise schedule.

7. The exercise support system according to claim 1, wherein
the message is related to a date, a day of a week, a time period defined in the exercise schedule.

8. The exercise support system according to claim 1, wherein
the message is a message of support for encouraging the first user to exercise.

9. A computer-implemented exercise support method performed by a computer, the exercise support method comprising:
receiving a detection signal related to a detection of an exercise of a first user;
acquiring an exercise schedule of the first user;
transmitting a message request to a terminal of a second user before the exercise schedule;
receiving a message corresponding to the message request from the terminal of the second user;
determining whether or not the first user is exercising according to the exercise schedule based on the exercise schedule and the detection signal; and
providing the first user with the message from the terminal of the second user when it is determined that the first user is exercising according to the exercise schedule.

10. A non-transitory computer readable medium storing a program for causing a computer to execute the computer-implemented exercise support method according to claim 9.

* * * * *